Feb. 3, 1953    M. M. LEVY ET AL    2,627,553

MULTICHANNEL SIGNALLING SYSTEM

Filed Oct. 21, 1948    4 Sheets-Sheet 1

INVENTORS
MAURICE MOISE LEVY
DENNIS CLARK ESPLEY
BY [signature]
ATTORNEY

MULTICHANNEL SIGNALLING SYSTEM

Filed Oct. 21, 1948

4 Sheets-Sheet 2

INVENTORS
MAURICE MOISE LEVY
DENNIS CLARK ESPLEY
By. Morris Kirschstein
ATTORNEY Feb. 3, 1953 M. M. LEVY ET AL 2,627,553

MULTICHANNEL SIGNALLING SYSTEM

Filed Oct. 21, 1948 4 Sheets-Sheet 3

INVENTORS
MAURICE MOISE LEVY
DENNIS CLARK ESPLEY
By [signature]
ATTORNEY

INVENTORS
MAURICE MOISE LEVY
DENNIS CLARK ESPLEY
BY Maurice Kinchstein
ATTORNEY

Patented Feb. 3, 1953 2,627,553

UNITED STATES PATENT OFFICE 2,627,553

MULTICHANNEL SIGNALING SYSTEM

Maurice Moise Levy, Earls Court, and Dennis Clark Espley, North Wembley, England, assignors to The General Electric Company, Limited, London, England Application October 21, 1948, Serial No. 55,732
In Great Britain November 21, 1946

9 Claims. (Cl. 179—15)

Figure 1:
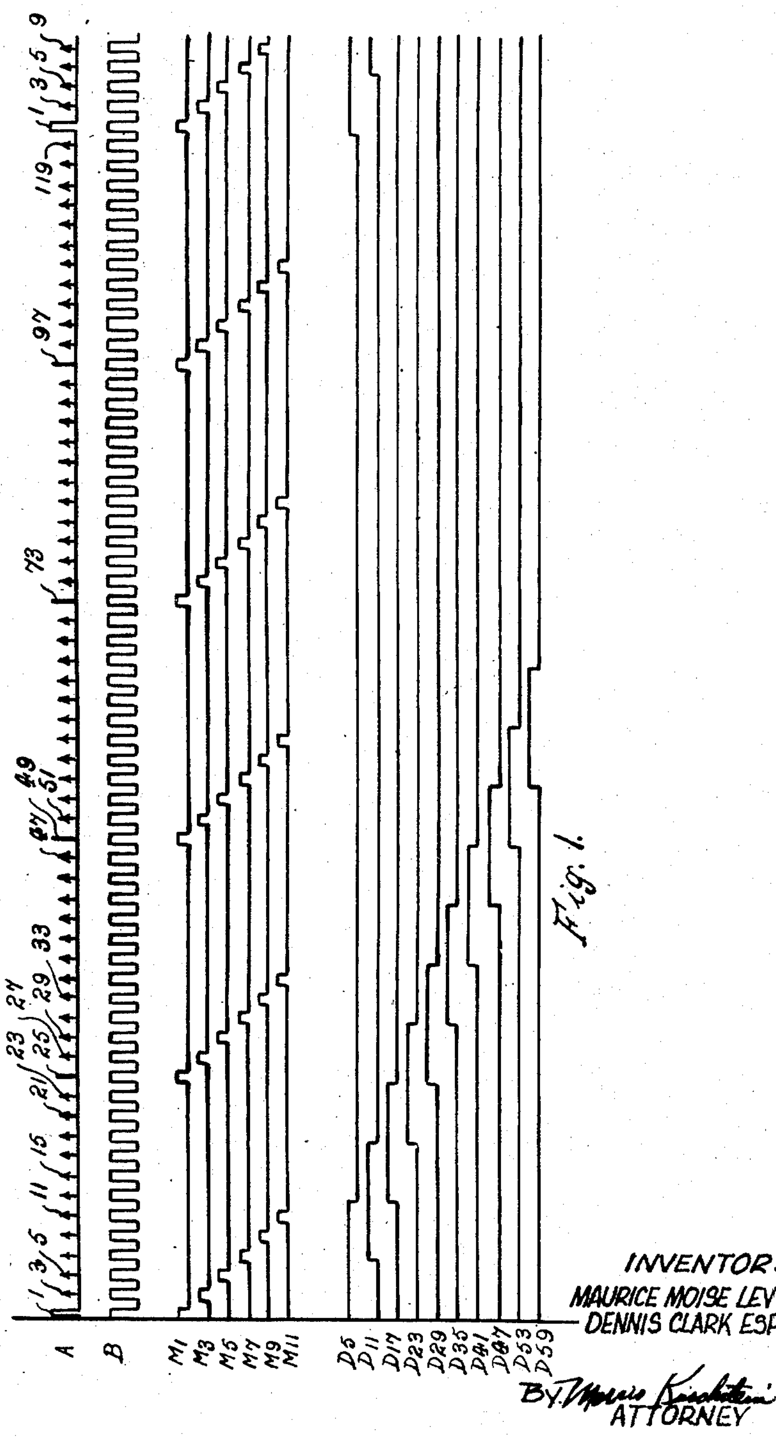

The present invention relates to multi-channel signalling systems employing modulated pulses and has for its principal object to increase the number of channels which can be employed with a given complexity of apparatus or to enable simpler apparatus to be used for a given number of channels.

Such arrangements for multi-channel signalling usually comprise a distributor which generates N trains of selector pulses at a suitable recurrence frequency F cycles per second which is the same for all the trains, N being the number of channels. The N trains are interlaced with one another, in other words the pulses of each train are time-delayed relatively to those of the preceding train. In order to employ the maximum possible number of channels, the duration of the selector pulses in seconds is made equal to, or only slightly less than $1/NF$. A number of modulators, equal to the number N of channels, is provided and each produces modulated pulses at the same frequency F.

For systems employing large numbers of pulses, the apparatus becomes very complicated. For instance one known form of modulator is of the electronic distributor type comprising a cathode ray tube having means for deflecting the cathode ray in a circular track over a plate which contains a number of slots equal to the number of channels. These slots are arranged to lie obliquely across the track of the cathode ray and when the cathode ray traverses each slot electrons pass through the slot to a collecting electrode and a positive pulse is generated at the plate owing to the cessation, or reduction, in the collection of electrons by the plate. Alternatively, use may be made of the negative pulses which are generated at the collecting electrode when the cathode ray traverses the slots. A number of deflecting means, such as pairs of deflecting plates, equal to the number of channels is provided and these are so disposed that each co-operates with a different slot and can deflect the cathode ray, radially inwards and outwards, during the time the ray is passing over the corresponding slot. In this way the instant at which the positive or negative pulse occurs can be varied in accordance with a modulation voltage and what is known as time modulation of the pulses is obtained. Each deflecting means with its slot constitutes what may be called a channel modulator and the rotating cathode ray constitutes a distributor to render each channel modulator operative in turn.

The modulated pulses at the anode are transmitted by wire or radio to a receiver where the pulses of the several channels are separated and demodulated.

If the number of channels is large, for instance 100 or more, it is evident that the distributor-modulators become complicated and difficult to manufacture and an electronic device of the kind above described needing say 100 channel modulators is probably not practical.

According to the present invention, in a multi-channel pulse signalling system for operating N channels each at a recurrence frequency F, there are provided $N/a$ channel modulating or demodulating devices, each operating upon a different group of $a$ equally spaced channels where $a$ is an integer, and distributor means are provided for coupling each channel to its associated modulator or demodulator at the appropriate times.

In the case of modulation the said device may be either a device which modulates pulses in accordance with signals in the manner required for transmission or performs at least one step in such modulation; for instance produces amplitude-modulated pulses which are subsequently converted to width-modulated pulses. In the case of demodulation, the said device is not one performing the final demodulation but an intermediate step such for example as the conversion of time-modulation into width modulation. In either case the invention enables the apparatus to be simplified considerably.

Figure 2:
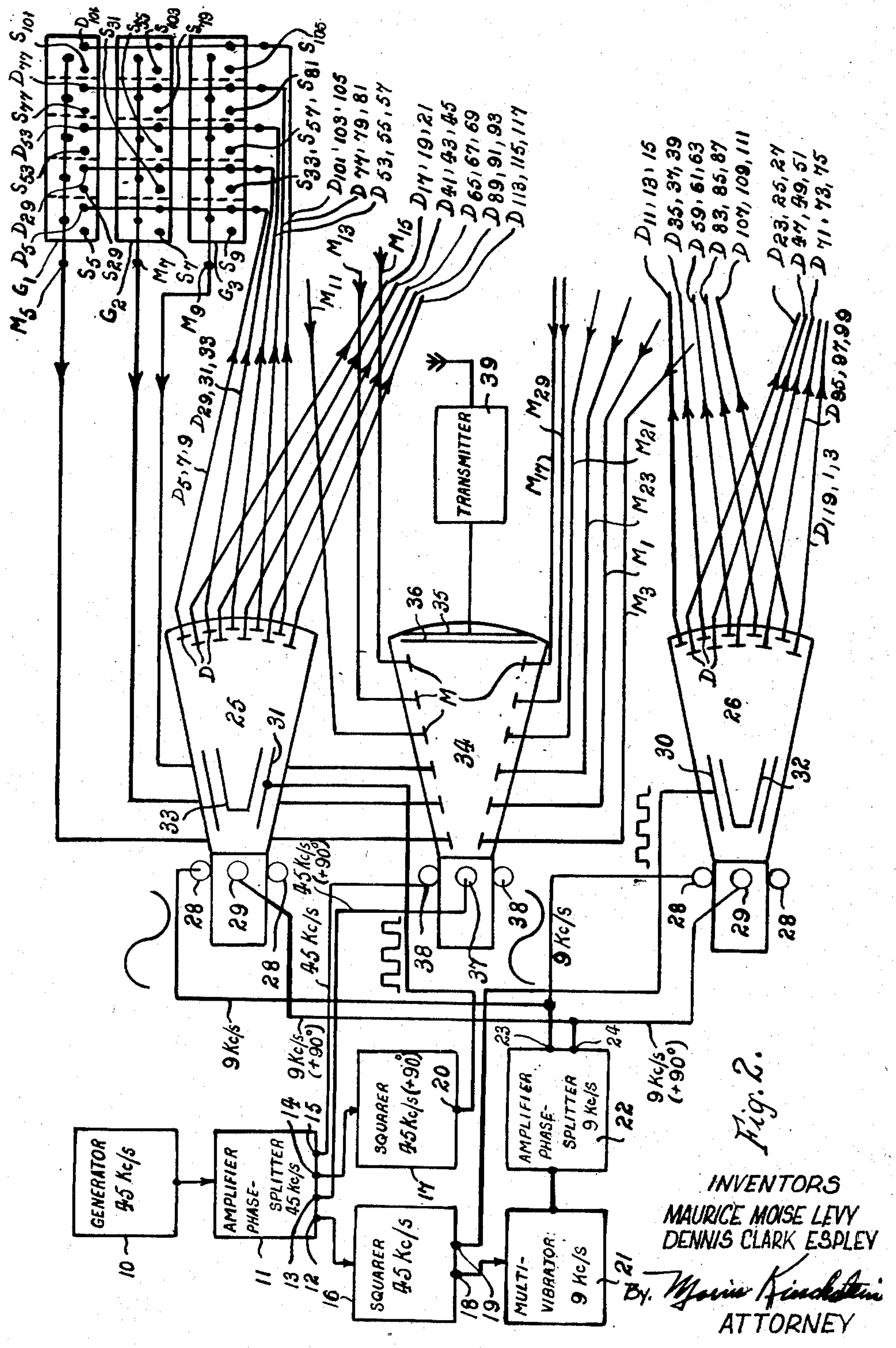
Figure 3:
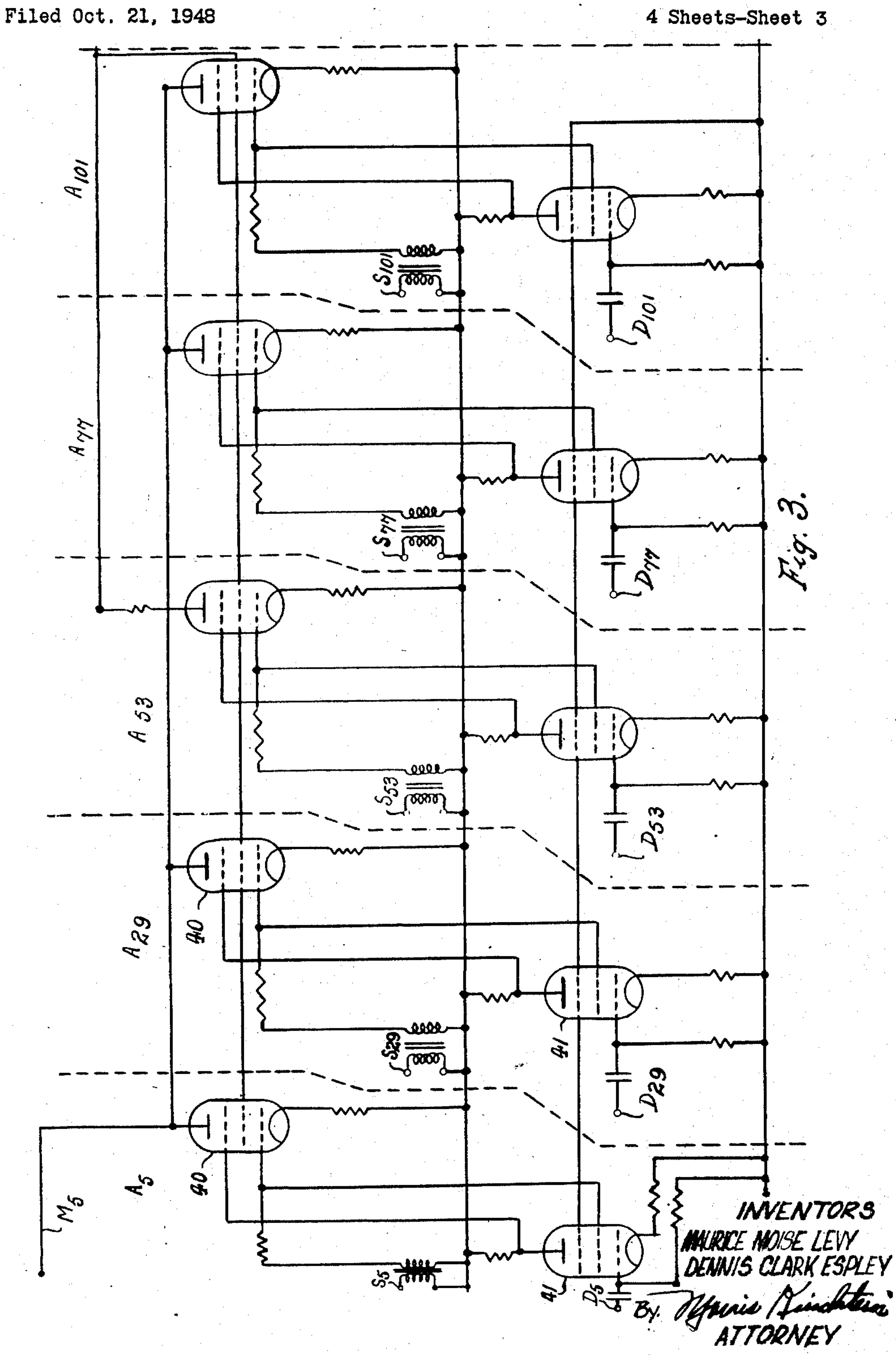
Figures 4, 5:
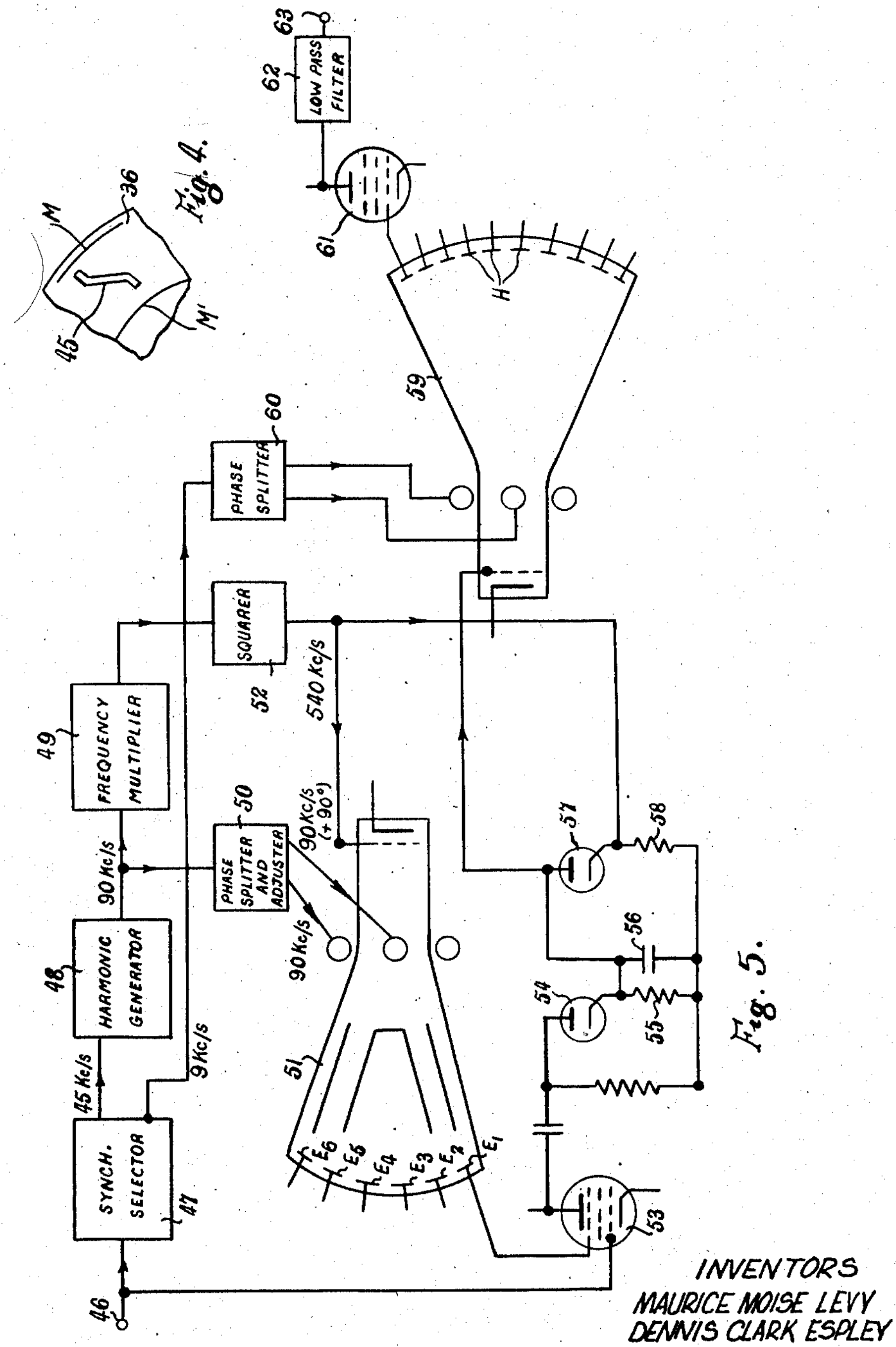

The invention will be described by way of example with reference to the accompanying drawings in which Figure 1 is a diagram illustrating the operation of a 120 channel modulating system according to the invention, Figure 2 is a circuit diagram of such a system, Figures 3 and 4 show parts of Figure 2 in greater detail and Figure 5 is a diagram illustrating the operation of a 120 channel demodulating system according to the invention.

Referring to Figure 1, there are shown at A channel pulses numbered 1, 3, 5 etc. to 119 and then repeating, every pulse 1, 3 etc. having a recurrence frequency of 9 kc./s. Every 24th pulse is of larger amplitude and serves as a synchronising pulse. Pulses 1 are of different characteristics from the remaining synchronising pulses, such as 25, 49, 73 etc., for instance as shown they may be wider, and serve for synchronisation at the chanel pulse repetition frequency. The pulses 3, 5 . . . 23; 27 . . . 47 etc. inclusive are modulated respectively, for example in time, with different channel signals.

The square wave oscillation B of frequency 540 kc./s. can be regarded as a train of pulses at a recurrence frequency of 540 kc./s., these pulses defining the channel width allotted to each channel, in this case about 0.925 microsecond.

Figure 1 shows at A the channel pulses for the odd numbered channels. There is a like number of even numbered channels 2, 4, 6 etc. and the time intervals allotted to these are defined by pulses at 540 kc./s. of opposite sense to the B pulses. Further synchronising pulses may be provided for the even channels if desired and these may be spaced approximately midway between those for the odd channels.

With this arrangement $N=120$, $F=9$ kc./s. and the maximum width of a channel as defined by the pulses B is, as stated, about 0.925 microsecond. To avoid confusion with other reference numerals, channel pulses will hereinafter be referred to as $A_1$, $A_3$ etc. and selecter pulses which define the channel widths as $B_1$, $B_3$ etc.

Referring now to Figure 2, there is shown a master generator 10 generating a sine wave oscillation at a frequency of 45 kc./s. This oscillation is fed to a device 11 which amplifies the oscillation and provides at each of terminals 12, 13, 14 and 15 an output voltage at 45 kc./s., the voltage at the terminals 14 and 15 leading that at the terminals 12 and 13 in phase by 90°. Typical of phase-splitters which will cause the voltage at the terminals 14 and 15 to lead the voltage at the terminals 12 and 13 are apparatuses disclosed in the following:

"Time Bases" by O. S. Puckle (Chapman and Hall), page 76, Fig. 51, the circuit including elements $R_2$, $R_3$, $C_2$, $C_3$;
"Journal of the Institution of Electrical Engineers," volume 93, part IIIA No. 1, Proceedings at the Radio-location Convention, page 294, Fig. 7;
"Waveforms": The M. I. T. Radiation Laboratory Series (McGraw Hill), Section 4.12, page 137, Fig. 4 34 (*a*) and (*d*);
"Electrical Communication" (International Standard Electric Corporation) volume 18, No. 3, January 1940, page 216, Figure 15; "90° phase shifter";
"Frequency Modulation" by August Hund, New York 1942, Fig. 75 on page 242: "90° phase shifter."

The terminals 12 and 14 are connected respectively to devices 16 and 17 which serve to square the wave form. Examples of such squaring devices are given in Radio Engineers' Handbook by F. E. Terman, 1943, page 970, Fig. 76 and footnotes 3, 4 and 5. A square wave at 45 kc./s. thus appears at terminals 18 and 19 of device 16 and a second square wave of the same frequency but differing in phase by 90° appears at terminal 20 of device 17. The terminal 18 is connected to a multivibrator 21 acting as a frequency divider running at 9 kc./s. A suitable vibrator is exemplified in the Radio Engineers' Handbook above referred to, page 512, Fig. 32 (*a*). The output of the device 21 is fed to a selective amplifier 22 which provides at its output terminals 23 and 24 sine wave oscillations at 9 kc./s., that at 24 leading that at 23 by 90° in phase. The phase-splitting portion of the amplifier 22 may be constructed in the same manner as the corresponding part of the amplifier 11. The frequencies and relative phases of voltages at various points in the circuit are marked on the drawing.

At 25 and 26 are shown two distributors in the form of cathode ray tubes. In these tubes the anodes D are disposed overlapping one another in two annular zones one within the other, the centres of the anodes in one zone lying radially opposite the centres of the spaces between the anodes in the other zone. The cathode ray is caused to rotate in a conical path and is deflected radially to engage anodes in the two zones alternately. In this way the rate of switching can be made independent of the speed of rotation of the cathode ray. Another advantage is that a greater number of anodes of given size can be accommodated in a tube of given size.

In Figure 2, there are ten anodes D in each tube 25 and 26. The cathode ray is caused to rotate by two sinusoidal oscillations at 9 kc./s., 90° displayed in phase relatively to one another applied to the two pairs of deflecting coils 28 and 29 from terminals 23 and 24 respectively. The ray is deflected radially by means of square wave oscillations at 45 kc./s. applied from terminals 19 and 20 to outer conical electrodes 30 and 31 respectively, the inner conical electrodes 32 and 33 being earthed. The deflection applied is such that the cathode ray is moved thereby from the outer anode zone to the inner anode zone and vice versa.

At 34 in Figure 2 is shown a cathode ray distributor-modulator tube of known type. In front of its collecting electrode 35 is arranged a plate 36 having a number of slots 45 as shown in Figure 4, which is a view in an axial direction of part of the right hand end of the tube 34 in Figure 2. The slots 45 are arranged in an annular zone and the essential parts thereof are inclined at about 45° to the circular centre line of the zone. As the cathode ray is swept over these slots electrons pass through and reach the collecting electrode 35 which thus receives a series of negative pulses. In the present example there are twelve slots and co-operating with each is a deflecting electrode M. These deflecting electrodes are placed as shown in Figure 2 only for the sake of clearness; in practice they are arranged as indicated in Figure 4 in a ring within the tube, each being near to the cathode ray when it engages one slot and being capable, when fed with signal voltage, of deflecting the cathode ray radially in accordance with the signal and thus varying the instant at which the negative pulse is generated at the electrode 35. The electrodes M co-operate with an inner electrode $M^1$, shown in Figure 4, which may be common to all the electrodes M.

The cathode ray in the tube 34 is caused to rotate by sine wave oscillations at 45 kc./s. fed from terminals 13 and 15 to its two pairs of deflecting coils 37 and 38, the oscillations being mutually phase displaced by 90°.

Modulated pulses generated at the electrode 35 of the tube 34 are fed to a transmitter 39.

A gating device is shown in block form at $G_1$, $G_2$ and $G_3$ in Figure 2 and one of these, namely $G_1$, is shown in detail in Figure 3. For clearness only three sections, $G_1$, $G_2$ and $G_3$ are shown in Figure 2. The arrangement of Figure 2 requires twelve such sections, i. e. four times the number shown, the other sections being referred to later as $G_4$, $G_5$ etc.

Referring to Figure 3, the circuit comprises, for each channel one valve 40 and one valve 41. For reasons to be explained later, each section, such as that of Figure 3, handles five channels spaced apart at intervals of 24 channels. Thus the five channel pulses handled by the circuit of Figure 3 are numbers $A_5$, $A_{29}$, $A_{53}$, $A_{77}$ and $A_{101}$ as indicated, the dotted lines showing the boundaries between channels. The signals of these channels are applied at terminals $S_5$, $S_{29}$, $S_{53}$, $S_{77}$ and $S_{101}$ to the control grids of the valves 40. Here and later in this specification the subscript in a reference indicates the number of the channel concerned with reference to pulses A in Figure 1. Gating pulses, in a negative sense, occurring at the instants when each channel is required to be operative, and hence at 9 kc./s., are derived, in a manner to be described later, and applied through terminals $D_5$, $D_{29}$ etc. to the control grids of the valves 41, the screen grids of the valves 41 are connected to the control grids of the corresponding valves 40 and the anodes of the valves 41 are connected to the suppressor grids of the corresponding valves 40.

Both the suppressor and control grids of the valves 40 are maintained by the action of the valves 41 sufficiently negative to cut off the electron current in the valves 40. When a negative gating pulse arrives at the control grid of one of the valves 41, for instance at terminal $D_5$, the small current previously flowing in this valve 41 is cut off, the negative bias is removed simultaneously from the control and suppressor grids of the valve 40 in channel $A_5$ and signals from $S_5$ are passed to the anode of the valve and to terminal $M_5$. All the anodes of the valves 40 are connected in common to this terminal $M_5$.

Referring again to Figure 2, the cathode rays in the tubes 25 and 26 are rotated at 9000 revolution per second and a square wave oscillation at 45 kc./s. serves to deflect the ray from one ring of five anodes to the other ring of five anodes. A pulse is therefore generated at each of these anodes once in every 1/9000 second. These pulses have the form shown at $D_5$, $D_{11}$, $D_{17}$ etc. in Figure 1 and a duration which includes *n* channels, *n* in this example being equal to 3. It will be observed that the leads connecting with the anodes D are referenced $D_{5,\ 7,\ 9}$, $D_{29,\ 31,\ 33}$ etc. This is because each of the anodes D is associated with the three channels whose numbers appear in the subscript. Since there are in all twenty anodes, sixty channels can be handled. These are the odd-numbered channels and the even-numbered channels are dealt with by a duplication of parts of the apparatus to be specified later.

In Figure 1, only ten trains of pulses $D_5$, $D_{11}$ etc., are shown. In fact there are twenty such trains extending over the pulse recurrence period of 1/9 millisecond from $D_5$ to $D_{119}$ inclusive.

The connections between the sections $G_1$, $G_2$ and $G_3$ of the gating device and the distributor 25 are shown in Figure 2. The correct connections between the other sections $G_4$, $G_5$ etc. will be evident from the references given to the leads from each of the anodes of the devices 25 and 26. Thus as shown one group of anodes (say those around the outer annulus) of the device 25 co-operates with gating sections $G_1$, $G_2$ and $G_3$, the other group of anodes from the device 25 co-operates with the gating sections $G_7$, $G_8$ and $G_9$. The outer group of anodes of the device 26 co-operates with sections $G_4$, $G_5$ and $G_6$ and the inner group of anodes of device 26 co-operate with the sections $G_{10}$, $G_{11}$ and $G_{12}$.

The terminal $M_5$ of Figures 2 and 3 is connected to one modulating electrode of the modulator M in Figure 2. As shown in Figure 2, corresponding terminals $M_7$ and $M_9$ of gating sections $G_2$ and $G_3$ are connnected with other modulating electrodes of the modulator M. The connections between terminals $M_{11}$, $M_{13}$ etc. of the other gating sections and the modulator M will be understood from the references given to the leads to the modulator electrodes.

Each of the pulse trains $D_5$, $D_{11}$ etc. in Figure 1 is, as stated, intended to co-operate with three channels. Thus train $D_5$ co-operates with channels $A_5$, $A_7$ and $A_9$; train $D_{11}$ with channels $A_{11}$, $A_{13}$ and $A_{15}$ and so on.

Consider the instant when it is required that channel $A_5$ should be operative. At this moment a pulse $D_5$ is operative on the control grid of valve 41 in channel $A_5$ of the gating device in Figure 3. The voltage at $M_5$ therefore corresponds to the instantaneous value of the signal applied at $S_5$. This voltage is applied from $M_5$ to one modulator electrode of the modulator in Figure 2 and determines the instant at which a negative pulse $A_5$ (Figure 1) occurs at the anode 35 of the modulator M. The channel pulse $A_5$ considered recurs at a frequency of 9 kc./s. and consequently every 1/9000 second there is transmitted a pulse whose location in time defines the instantaneous value of the signal voltage. The effect is substantially that of a pulse moving in time about a mid position, the limits of such movement being determined by the channel width—in this case about 0.925 microsecond.

Immediately after the time allotted to channel $A_5$ has passed that allotted to $A_6$ begins. This is an even-numbered pulse dealt with by additions to the circuit of Figure 2 to be referred to later. After this comes the turn of channel $A_7$. At this time a pulse of the train $D_5$ is still operative on the valve 41 of channel $A_7$ which will be in section $G_2$. The corresponding valve 40 is therefore rendered operative and an instantaneous signal voltage corresponding to the signal at $S_7$ (Fig. 2) will appear at $M_7$ and on the corresponding modulating electrode of M.

It will be noted that since the D pulses each serve to open three adjacent odd channels, signal voltages of three adjacent odd channels appear upon corresponding modulating electrodes of the modulator M. Thus for example electrodes $M_5$, $M_7$ and $M_9$ are all energised at the same time. This does not result in confusion of the signals of the three channels because the cathode ray beam of the device M comes under the influence of the different modulating electrodes in turn: when it is under the influence of electrode $M_5$, it is in the region of the slot in the plate 36 corresponding to channel 5. A moment later when the ray is in the region of the slot of channel 7, it is under the influence of the electrode $M_7$ and not of electrode $M_5$ or $M_9$ and so on.

The distributors 25 and 26 of Figure 2 must be correctly phased relatively to one another in such a manner that engagement with the anode $D_{11,\ 13,\ 15}$ of distributor 26, takes place between engagements with the anodes $D_{5,\ 7,\ 9}$ and $D_{17,\ 19,\ 21}$ of distributor 25. For this purpose one of the distributors may be rotatable relatively to its deflecting coils 28, 29 or electrical phase adjusting means may be provided for adjusting the phase of the currents fed to the coils 28 and 29 of one tube relatively to that fed to the coils of the other tube.

So far there has been described a system for handling 60 channels which are the odd A channels shown in Figure 1. In this system the number of channels $N=60$, the channel pulse recurrence frequency $F=9$ kc./s., and the number of equally spaced channels operated by one channel modulator, that is to say $a$, is 5 since the modulator M has 12 slots each of which operates with five channels; for example $M_5$ operates with channels $A_5$, $A_{29}$, $A_{53}$, $A_{77}$ and $A_{101}$, these channels being equally spaced. The channels handled by six of the twelve modulating electrodes of the device M are shown by the wave forms $M_1$, $M_3$ etc. in Figure 1.

For the even numbered channels, it is clearly possible to use the same D pulses as for the odd channels. The minimum addition to the apparatus of Figure 2, is therefore, one further modulator tube M and twelve further gating sections such as $G_1$ to $G_{12}$.

It is possible to use D pulses of longer duration and to use fewer different trains of D pulses. Each pulse train then handles more than three channels of the sixty (or more than six of the hundred and twenty). It is, however, necessary to ensure that there can be no overlap between the D pulses handling two channels spaced by 24 or more, for instance $A_5$ and $A_{29}$, since such channels are dealt with by a single modulator, in this example $M_5$.

In effect, by the use of the invention, there is obtained a multiplication of the number of channels that can be handled by a given modulator. Such multiplication can be repeated by the use of further distributors with co-operating gating circuits effectively in series with those shown in Figure 2.

Instead of providing a single deflecting means for each channel modulator $M_5$ etc., a plurality of such means (e. g. deflecting plates or pairs of deflecting plates) may be provided in association with each slot in the plate 35 of Figure 2, the deflecting means being disposed at different points along the cathode ray beam. Each deflecting means may be arranged to deal with one or more channels and the associated distributors are modified accordingly. It is preferably arranged, by suitable spacing of the deflecting plates or by feeding suitably different signal amplitudes to the individual deflecting means, that all have approximately the same sensitivity.

Instead of the master generator 10 being one operating at the higher frequency, it may operate at the lower frequency (in the example 9 kc./s.) and the higher frequency (in the example 45 kc./s.) may be obtained therefrom by frequency-multiplication.

Demodulation at a receiver is accomplished in an analogous manner to the modulations.

One receiving arrangement will be described by way of example with reference to Figure 5. The received signals of the character shown at A in Figure 1 are applied at 46 to a synchronizing signal selector 47 of any known or suitable type which selects the synchronizing signals from the channel pulses and separates the 9 kc./s. synchronising pulses (A1) from the remaining synchronising pulses. Typical synchronizing signal selectors are disclosed in the following British patents: 407,951—Fig. 4, circuit No. 3; and page 3, lines 43–52; 470,495—Fig. 5, valve 16; and page 12, lines 36–47; 422,906—Fig. 9, valve 16; and page 11, line 104, page 12, line 3; 584,729—circuit including valves 42, 43, 45 and 46; and page 9, lines 49–88. The selector also furnishes synchronising pulses at 45 kc./s. corresponding to the pulses $A_1$, $A_{25}$, $A_{49}$ etc. The latter pulses are used to control the frequency of an oscillation generator 48 (it may use a circuit like that of the squares 16, 17), the second harmonic of whose output, namely 90 kc./s., is selected. This is frequency-multiplied by further harmonic selection in a multiplier 49, the 6th harmonic at 540 kc./s. being selected. Two sine wave oscillations at 90 kc./s. in quadrature produced from the oscillation generator 48 by a phase-splitter 50 (whose circuit is like that of the phase-splitting portions of the devices 11, 22) are applied to deflect the cathode ray of a distributor 51 in a conical path over six electrodes $E_1$, $E_2$ . . . $E_6$ respectively, and a rectangular waveform oscillation at the 540 kc./s. frequency from a squaring circuit 52 (whose circuit is like that of the square 16, 17) fed from the frequency multiplier 49 is applied to the control electrode of the distributor. The deflecting means of the distributor are made adjustable relatively to the distributor tube, or, as indicated in Figure 5, electric phase-adjusting means may be incorporated in the circuit 50.

Assuming that the arrangement is such that pulses are generated at the electrode $E_1$ at the instant of occurrence of channel 1, then pulses are generated at the same electrode at the instant of occurrence of channels 13, 25, 37 and so on to 109. At electrode $E_2$ the pulses generated correspond to channels 3, 15, 27 etc. to 111 and so on for the remainder of the six electrodes. These pulses serve as gating pulses to select channel pulses from one another.

Six selectors are provided, one associated with each electrode $E_1$, $E_2$ etc. although, for clearness, only that associated with electrode $E_1$ is shown. Each such selector may consist of a pentode valve 53 having the received signals applied in a negative sense to the control grid, and having the pulses $E_1$ or $E_2$ etc., as the case may be, applied to say the suppressor grid. The pulses applied to the suppressor grid must be positive in sense. This may be achieved either by arranging that the secondary emission from the electrodes $E_1$, $E_2$ etc. exceeds the primary current reaching the electrodes from the beam or by including between the electrodes and the selectors a phase-reversing stage. The pulses applied to the suppressor grid serve as gating pulses to pass through the selector only those of the channel pulses occurring at the instants of occurrence of pulses on the suppressor grid. In the case of electrode $E_1$ the selector associated therewith passes channel pulses 1, 13, 25 etc. The output of each selector is connected to a converting device for converting pulse-time into pulse-width modulation. The device may, for example, be as described in the specification of co-pending United States patent application No. 11,368 filed February 27, 1948, by Maurice Moise Levy. Thus it may comprise, as shown in Figure 5, a diode 54 having connected to its cathode a resistor 55 in parallel with a condenser 56. This resistor-condenser combination is arranged to have a time constant long compared with the channel width. The voltage across this resistor and condenser is applied to the anode of a second diode 57 having a resistor 58 connected to its cathode. Squared pulses at 540 kc./s. are applied from the squarer 52 to the cathode of the diode 57 in a positive sense. When a pulse passed by the selector 53 reaches the anode of the diode 54 the condenser 56 is charged rapidly because the diode 57 is at that time held non-conducting by the pulse from 52. When the channel pulse ceases the condenser 56 substantially retains its charge until the pulse from 52 ceases when it is rapidly discharged. The width-modulated pulses are obtained at the anode of the diode 57, their leading edge (in this example) varying in time of occurrence in accordance with the time of occurrence, and hence the modulation, of the channel pulses and their trailing edge occurring at fixed, regular instants determined by the trailing edges of the pulses from 52. The latter pulses are, of course, arranged to have their leading edges occurring not later than the earliest instants of occurrence of the corresponding channel pulses. The anode of the diode 57 is connected to the control electrode of a further cathode ray distributor 59 having ten output electrodes H arranged to be swept over in turn by a cathode ray, the deflecting means of this distributor being operated by two 9 kc./s. oscillations in quadrature obtained from the synchronising signal selector 47 through a phase-splitter 60 (whose circuit is like that of the phase-splitting portions of the devices 11, 22). Each of the output electrodes H is coupled through a separator valve 61 and a low-pass filter 62 to an output terminal 63, the filter serving, in known manner, to derive the modulation from the width-modulated pulses.

Only the separator valve and filter associated with one of the electrodes H is shown in Figure 5.

The distributor associated with the $E_1$ pulses will thus furnish at the ten output terminals 63 respectively the modulations of the ten channels 1, 13, 25 . . . 183.

A separate selector 53, converting device 54—58 and ten-electrode distributor 59 is required for each of the electrodes $E_1$, $E_2$ . . . $E_6$ and hence six such combinations are required for the odd-numbered channels.

The even-numbered channels require a further six-electrode distributor to the control electrode of which are fed oscillations at 540 kc./s. in the opposite phase to that used for the odd-numbered channels, and six further selectors, converter devices and ten-electrode distributors.

Many variations in the particular receiving arrangement described can of course be made. The numbers of electrodes on the distributors and hence the numbers of distributors may be varied and moreover other kinds of distributor may be used.

In any case the arrangement can be made such that a step in the demodulation process, in the above example conversion from time to width modulation, is performed upon a group of pulses of different channels before the separation of the individual channels of the group from one another. This results in a considerable economy of apparatus.

Instead of converting the time-modulation to width modulation, it may be converted to amplitude-modulation, and the modulation may then be derived by means of a low-pass filter as in the case of width modulation, or otherwise.

The invention whether used in transmitting or receiving is not limited to the use of the particular forms of modulator, demodulator and distributor described, nor to the use of electronic modulators and distributors, or to the use of time pulse modulation. Width modulation, obtained by triangular slots, or double time modulation, obtained by two slots having a V shape, with the advantage of lower distortion, may be used.

Other known or suitable devices may be used.

We claim:

1. A multi-channel pulse signalling system for operating up to N channels each at the same recurrence frequency, said channels constituting $N/a$ groups each of $a$ equally-spaced channels, where $a$ is an integer greater than unity, said system comprising means for the uni-directional inter-conversion between modulated and unmodulated pulses, said means including $N/a$ devices for at least partially effecting such inter-conversion, and distributor means for coupling in succession to each of said devices the channels of a different one of said groups.

2. A system according to claim 1, wherein each device is a modulator and each channel constitutes a source of modulating signals, and wherein means is provided to generate pulses to be modulated.

3. A system according to claim 1, wherein each device is a part of a demodulator, and wherein there are provided selectors for separating received pulses into said groups and means for applying received modulated pulses to said selectors.

4. A system according to claim 3, wherein received pulses are time-modulated, and wherein each device comprises a circuit for converting time-modulated pulses into width-modulated pulses.

5. A multi-channel pulse signalling system for operating up to N channels each at the same recurrence frequency, said channels constituting $N/a$ groups each of $a$ equally-spaced channels, where $a$ is an integer greater than unity, said system comprising a cathode ray tube pulse modulator system including $N/a$ modulators and means to sweep the cathode ray beam of said tube into cooperation with said modulators in recurring succession to generate a pulse in each of said modulators at each such cooperation, N sources of modulating signals, and a cathode ray tube distributor to apply signals from $a$ of said sources successively to each of said modulators to modulate successively pulses in said modulator respectively.

6. A multi-channel pulse signalling system for operating up to N channels each at the same recurrence frequency said channels constituting $N/a$ groups each of $a$ equally-spaced channels, where $a$ is an integer, said system comprising $N/a$ sets each of $a$ gating devices each passing to the output thereof only such of the signals impressed thereon as occur during the presence of gating pulses, means for impressing signals from different channels continuously upon different gating devices respectively, means for generating trains of gating pulses of the said recurrence frequency and displaced in time relatively to one another, means for applying said trains to said gating devices to control the passage of signals through such devices, the gating pulses applied to each set being free from overlap in time, $N/a$ modulating devices, means for rendering said modulating devices operative in succession to produce pulses modulated in accordance with signals applied thereto and means for coupling the output of one of said sets of gating devices to each said modulating device, whereby the successive pulses from each of said modulating devices are modulated in accordance with a different one of said channels.

7. A multi-channel pulse signalling system for operating up to N channels each at the same recurrence frequency, said channels constituting $N/a$ groups each of $a$ equally-spaced channels, where $a$ is an integer, said system including a receiver for time-modulated pulses comprising means for generating $N/a$ trains of gating pulses, such trains being equally spaced in time, means for synchronising such pulses in accordance with received synchronising signals, $N/a$ gating devices each having an input circuit for received signals, an output circuit and a control circuit for the application of gating pulses to permit the passage of said received signals to said output circuit only during said gating pulses, means for applying said trains of gating pulses to said control circuits respectively, $N/a$ circuits for converting time-modulated pulses to width-modulated pulses, means for connecting each said output circuit to a different one of said converting circuits, N demodulators for extracting the modulation from width-modulated pulses, distributor means for coupling each of said converting circuits to $a$ of said demodulators in succession.

8. A transmitter for multi-channel pulse signalling for transmitting signals from up to N channels each by a train of pulses, the pulses of the trains having the same pulse recurrence frequency, said channels constituting $N/a$ groups each of $a$ equally-spaced channels, where $a$ is an integer greater than unity, said transmitter comprising $N/a$ modulating devices for modulating pulses in dependence upon signals applied to a modulating terminals thereof, and distributor means for coupling in succession to each of said modulating terminals the channels of a different one of said groups.

9. A transmitter for multi-channel pulse signalling for transmitting signals from up to N channels each by a train of pulses, the pulses of the trains having the same pulse recurrence frequency, said channels constituting $N/a$ groups each of $a$ equally-spaced channels, where $a$ is an integer greater than unity, said transmitter comprising a cathode ray tube modulator system including $N/a$ modulating devices, and means to sweep the cathode ray beam of said tube into cooperation with said modulating devices in recurring succession to generate a pulse in each said modulator at each such cooperation, N sources of modulating signals, and a cathode ray tube distributor system to apply signals from each of said groups to a different one of said modulating devices and to apply the signals from the $a$ channels of each group successively to the appropriate modulating device to modulate successive pulses generated in such modulating device in accordance with the signals of a different channel in such group.

MAURICE MOISE LEVY.
DENNIS CLARK ESPLEY.

REFERENCES CITED

The following references are of record in the file of this patent:

UNITED STATES PATENTS

| Number | Name | Date |
|---|---|---|
| 2,036,350 | Montani | Apr. 7, 1936 |
| 2,041,245 | Haffcke | May 19, 1936 |
| 2,205,406 | Holcomb | June 25, 1940 |
| 2,395,467 | Deloraine | Feb. 26, 1946 |
| 2,418,116 | Grieg | Apr. 1, 1947 |
| 2,423,466 | Peterson | July 8, 1947 |
| 2,429,631 | Labin et al. | Oct. 28, 1947 |
| 2,474,810 | Arditi et al. | July 5, 1949 |
| 2,499,534 | Sorber | Mar. 7, 1950 |
| 2,499,844 | Boothroyd | Mar. 7, 1950 |
| 2,513,335 | Labin et al. | July 4, 1950 |
| 2,517,365 | Von Baeyer | Aug. 1, 1950 |
| 2,549,826 | Labin | Apr. 24, 1951 |

OTHER REFERENCES

"Pulse Time Modulated Multiplex Radio Relay System Terminal Equipment," Electrical Communication, vol. 23, June 1946, pages 159–178.